（12）United States Patent
Agarwal

(10) Patent No.: US 11,494,101 B2
(45) Date of Patent: Nov. 8, 2022

(54) STORAGE SYSTEM AND METHOD FOR TIME-DURATION-BASED EFFICIENT BLOCK MANAGEMENT AND MEMORY ACCESS

(71) Applicant: Western Digital Technologies, Inc., San Jose, CA (US)

(72) Inventor: Dinesh Kumar Agarwal, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/176,852

(22) Filed: Feb. 16, 2021

(65) Prior Publication Data

US 2022/0113869 A1 Apr. 14, 2022

Related U.S. Application Data

(60) Provisional application No. 63/091,500, filed on Oct. 14, 2020.

(51) Int. Cl.
*G06F 3/06* (2006.01)
*G06F 12/02* (2006.01)

(52) U.S. Cl.
CPC .......... *G06F 3/064* (2013.01); *G06F 3/0611* (2013.01); *G06F 3/0652* (2013.01); *G06F 3/0679* (2013.01); *G06F 12/0253* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 5,978,928 A * | 11/1999 | Rust | ...................... | G06Q 10/00 |
| | | | | 713/502 |
| 6,348,881 B1 * | 2/2002 | Buer | .................. | H03M 7/3084 |
| | | | | 375/240 |
| 6,373,803 B2 * | 4/2002 | Ando | ..................... | G11B 20/10 |
| | | | | 369/59.25 |
| 6,978,083 B2 * | 12/2005 | Ando | .................. | G11B 27/329 |
| | | | | 386/241 |
| 7,079,051 B2 * | 7/2006 | Storer | ..................... | H03M 7/30 |
| | | | | 341/51 |
| 7,079,753 B2 * | 7/2006 | Ando | ..................... | G11B 27/32 |
| | | | | 386/211 |

(Continued)

OTHER PUBLICATIONS

Damien Col, "Understanding Flash memory: p. 2 of 4", Dec. 18, 2017, pp. 1-3, https://www.eenewseurope.com/news/understanding-flash-memory/page/0/1 (Year: 2017).*

(Continued)

*Primary Examiner* — Christopher D Birkhimer
(74) *Attorney, Agent, or Firm* — Crowell & Moring LLP

(57) ABSTRACT

A storage system and method for time-duration-based efficient block management and memory access are provided. In one embodiment, a controller of the storage system is configured to receive time stamps from a host for each of a plurality of blocks in the memory; determine a time duration for programming each of the plurality of blocks based on the time stamps; and differentiate the plurality of blocks based on the time durations. Other embodiments are provided.

18 Claims, 9 Drawing Sheets

(56) References Cited

U.S. PATENT DOCUMENTS

| | | | |
|---|---|---|---|
| 7,110,661 B2* | 9/2006 | Ando | G11B 20/00666 |
| | | | 386/330 |
| 7,274,714 B2* | 9/2007 | Raisanen | H04L 29/06 |
| | | | 370/394 |
| 7,506,372 B2* | 3/2009 | Mulrane, Jr | H04L 41/00 |
| | | | 726/22 |
| 7,529,544 B1* | 5/2009 | Oh | H04W 60/04 |
| | | | 455/426.2 |
| 7,574,118 B2* | 8/2009 | Ando | G11B 27/034 |
| | | | 386/329 |
| 8,516,019 B2 | 8/2013 | Hunt et al. | |
| 8,588,584 B2* | 11/2013 | Ando | G11B 7/005 |
| | | | 386/241 |
| 8,825,721 B2 | 9/2014 | Hunt et al. | |
| 8,938,636 B1* | 1/2015 | Hochschild | H04L 7/0012 |
| | | | 713/401 |
| 9,122,585 B2* | 9/2015 | Shim | G06F 3/061 |
| 9,122,587 B2 | 9/2015 | Baryudin et al. | |
| 9,203,600 B1* | 12/2015 | Hochschild | H04J 3/0667 |
| 9,230,000 B1* | 1/2016 | Hsieh | H04L 67/1095 |
| 9,305,662 B2 | 4/2016 | Tsai et al. | |
| 9,473,954 B2* | 10/2016 | Jiang | H04W 24/02 |
| 9,632,926 B1* | 4/2017 | Souri | G06F 12/0253 |
| 9,747,310 B2* | 8/2017 | Hsieh | G06F 16/2329 |
| 10,073,654 B1* | 9/2018 | Lockwood | G06F 3/1278 |
| 10,095,653 B2* | 10/2018 | McGowan | G06F 13/1673 |
| 10,114,744 B2* | 10/2018 | Souri | G06F 12/0246 |
| 10,241,735 B1* | 3/2019 | Lockwood | G06F 3/1215 |
| 10,331,392 B1* | 6/2019 | Lockwood | G06F 3/1294 |
| 10,417,123 B1* | 9/2019 | Souri | G06F 12/0253 |
| 10,613,781 B2 | 4/2020 | Melik-Martirosian | |
| 10,652,659 B2* | 5/2020 | Bhalla | H04R 3/00 |
| 10,790,922 B2* | 9/2020 | Sheet | H04J 3/0664 |
| 2001/0014058 A1* | 8/2001 | Ando | G11B 27/3027 |
| | | | 369/32.01 |
| 2001/0014070 A1* | 8/2001 | Ando | G11B 7/005 |
| | | | 369/59.25 |
| 2001/0044856 A1 | 11/2001 | Agesen et al. | |
| 2002/0150381 A1* | 10/2002 | Ando | G11B 27/00 |
| | | | 386/211 |
| 2003/0007180 A1* | 1/2003 | Urasawa | G06K 15/1863 |
| | | | 358/1.16 |
| 2003/0108033 A1* | 6/2003 | Raisanen | H04L 69/164 |
| | | | 370/352 |
| 2003/0118320 A1* | 6/2003 | Ando | G11B 27/30 |
| | | | 386/241 |
| 2005/0259954 A1* | 11/2005 | Ando | G11B 27/329 |
| | | | 386/330 |
| 2006/0250954 A1* | 11/2006 | Mulrane, Jr. | H04L 41/00 |
| | | | 370/229 |
| 2009/0274446 A1* | 11/2009 | Ando | G11B 27/3027 |
| | | | 386/248 |
| 2009/0319255 A1 | 12/2009 | Vengerov | |
| 2010/0138588 A1 | 6/2010 | Lin et al. | |
| 2013/0173854 A1* | 7/2013 | Shim | G06F 3/064 |
| | | | 711/103 |
| 2014/0006458 A1* | 1/2014 | Hsieh | G06F 16/2329 |
| | | | 707/803 |
| 2014/0143517 A1* | 5/2014 | Jin | G06F 3/067 |
| | | | 711/171 |
| 2015/0339057 A1 | 11/2015 | Choi et al. | |
| 2016/0132581 A1* | 5/2016 | Hsieh | G06F 16/273 |
| | | | 707/615 |
| 2017/0286359 A1* | 10/2017 | McGowan | G06F 13/4291 |
| 2017/0329525 A1* | 11/2017 | Simonson | G06F 12/00 |
| 2017/0357571 A1* | 12/2017 | Souri | G06F 12/0253 |
| 2017/0357674 A1* | 12/2017 | Hsieh | G06F 16/2329 |
| 2018/0095698 A1* | 4/2018 | Liao | G06F 3/0644 |
| 2019/0045304 A1* | 2/2019 | Bhalla | H04R 3/00 |
| 2019/0065788 A1* | 2/2019 | Vijayasankar | G06F 21/78 |
| 2019/0179580 A1* | 6/2019 | Lockwood | H04N 1/0005 |
| 2019/0297588 A1* | 9/2019 | Roy | H04L 43/106 |
| 2020/0242024 A1* | 7/2020 | Du | G11C 11/4099 |
| 2020/0310675 A1* | 10/2020 | Cho | G06F 3/064 |

OTHER PUBLICATIONS

Margaret Rouse, "3D NAND flash", May 2016, pp. 1-6, https://web.archive.org/web/20171107235947/https://searchstorage.techtarget.com/definition/3D-NAND-flash (Year: 2016).*

International Search Report dated Nov. 2, 2021 for International Application No. PCT/US2021/034142.

Written Opinion dated Nov. 2, 2021 for International Application No. PCT/US2021/034142.

* cited by examiner

STORAGE SYSTEM AND METHOD FOR TIME-DURATION-BASED EFFICIENT BLOCK MANAGEMENT AND MEMORY ACCESS

CROSS-REFERENCE TO RELATED APPLICATION

This application claims the benefit of U.S. provisional patent application No. 63/091,500, filed Oct. 14, 2020, which is hereby incorporated by reference.

BACKGROUND

A storage system can contain a controller and a non-volatile memory for storing data from a host. In operation, the host sends a write command with a logical block address to the storage system, and the controller in the storage system stores the data in a physical address in the memory. When the data takes the form of media content with largely sequential data (e.g., video or audio files), the data can span multiple blocks. The storage system can distinguish the blocks based on the amount of valid data stored in a block or on the properties of the block (e.g., how many times the block has been cycled or the bit error rate (BER) of the block). In some other systems, the host can send metadata to the storage system to differentiate various content, and the storage system can use the metadata to treat blocks storing the various content differently.

DETAILED DESCRIPTION

Overview

Figure 1A:
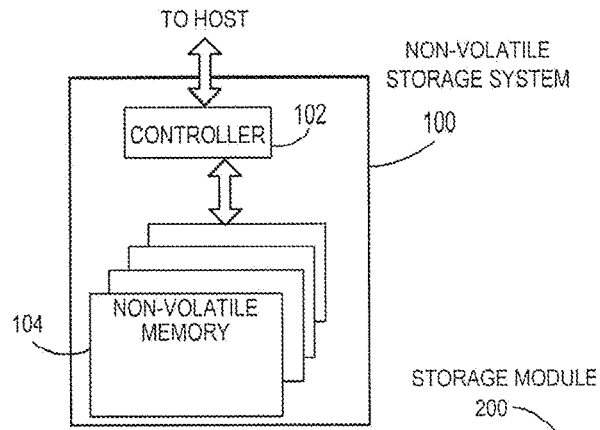
FIG. 1A is a block diagram of a non-volatile storage system of an embodiment.

By way of introduction, the below embodiments relate to a storage system and method for time-duration-based efficient block management and memory access. In one embodiment, a storage system is provided comprising a memory and a controller. The controller is configured to receive time stamps from a host for each of a plurality of blocks in the memory; determine a time duration for programming each of the plurality of blocks based on the time stamps; and differentiate the plurality of blocks based on the time durations.

In some embodiments, the controller is further configured to determine a time duration for a given block by calculating a difference between a time stamp of that block and a time stamp of a next block.

In some embodiments, the plurality of blocks are differentiated for a memory management operation.

In some embodiments, the memory management operation comprises a garbage collection operation, an error protection operation, a wear leveling operation, a read scrub operation, or a resource sharing operation.

In some embodiments, the plurality of blocks are differentiated for a search operation.

In some embodiments, time stamps are received from the host at a boundary of a block, a boundary of a sub-block, or a boundary of a set of wordlines.

In some embodiments, time stamps are received from the host at a time configured by the storage system.

In some embodiments, the memory comprises a three-dimensional memory.

In another embodiment, a method is provided that is performed in a storage system comprising a memory. The method comprises determining a programming duration of each of a plurality of storage areas in the memory; and prioritizing the plurality of storage areas based on the programming durations.

In some embodiments, the programming durations are determined from time information received from a host for each of the plurality of storage areas.

In some embodiments, time information is received from the host at a boundary of a block, a boundary of a sub-block, or a boundary of a set of wordlines.

In some embodiments, time information is received from the host at a time configured by the storage system.

In some embodiments, the programming duration for a given storage area is determined by calculating a difference between time information for that storage area and time information for a next storage area.

In some embodiments, the plurality of storage areas are prioritized for a memory management operation.

In some embodiments, the memory management operation comprises a garbage collection operation, an error protection operation, a wear leveling operation, a read scrub operation, or a resource sharing operation.

In some embodiments, the plurality of storage areas are prioritized for a search operation.

In another embodiment, a storage system is provided comprising a memory; means for using time information received from a host to determine how much time was spent programming each of a plurality of blocks of the memory; and means for prioritizing the plurality of blocks based on how much time was spent programming each of the plurality of blocks.

In some embodiments, the time information is received from the host at a boundary of a block, a boundary of a sub-block, a boundary of a set of wordlines, or at a time configured by the storage system.

In some embodiments, the plurality of blocks are prioritized for a memory management operation.

In some embodiments, the plurality of blocks are prioritized for a search operation.

Other embodiments are possible, and each of the embodiments can be used alone or together in combination. Accordingly, various embodiments will now be described with reference to the attached drawings.

EMBODIMENTS

Figure 1B:
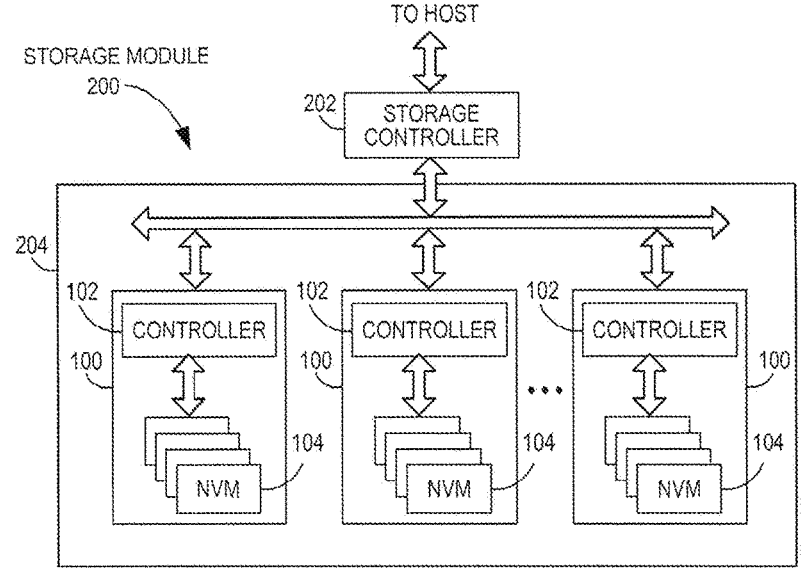
FIG. 1B is a block diagram illustrating a storage module of an embodiment.
Figure 1C:
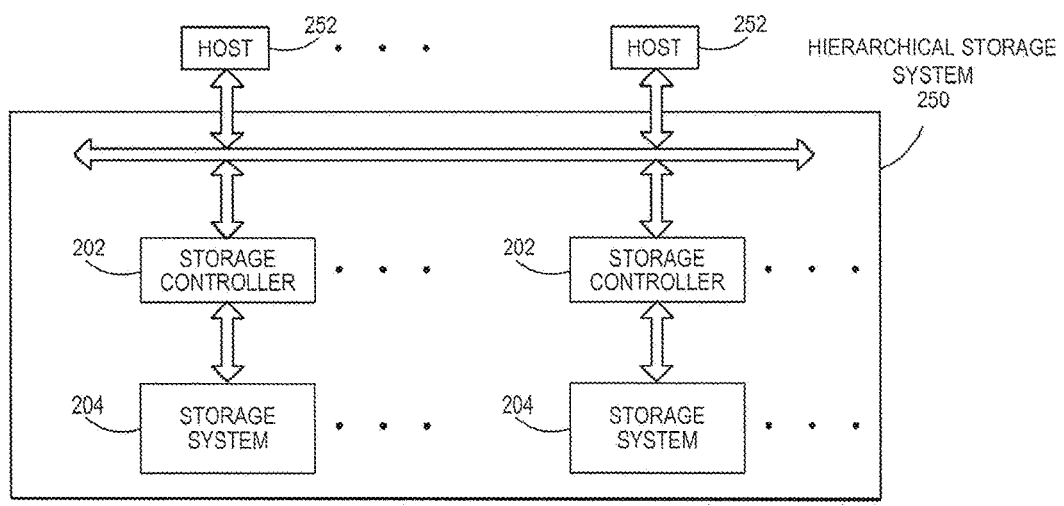
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
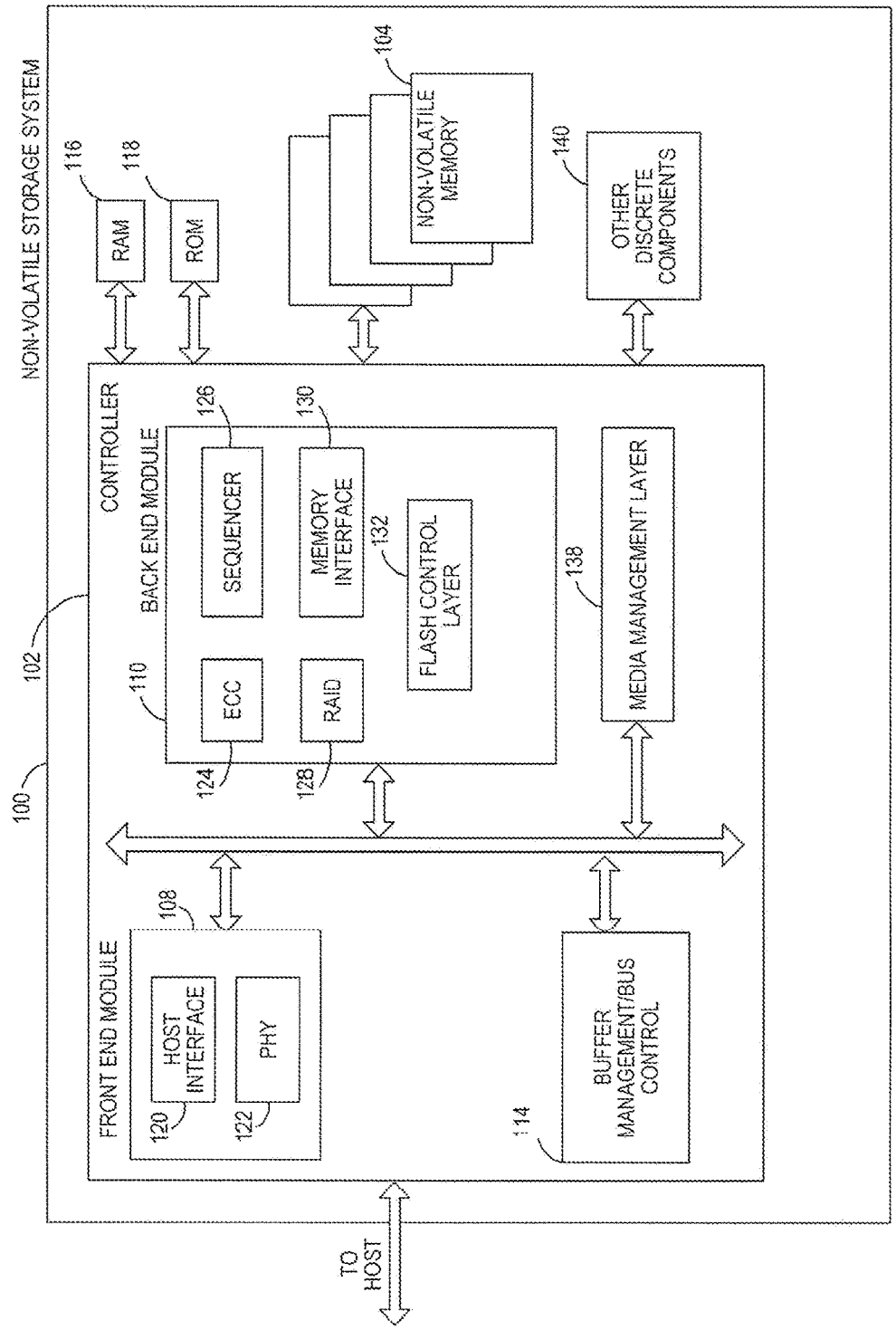
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually per-forms a particular function of related functions, or a self-contained hardware or software component that interfaces with a larger system, for example. Also, as used herein, means for performing a function can be implemented with a controller providing the function either though all hardware or a combination of hardware and software. Of course, this is just an example, and other implementations can be used.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
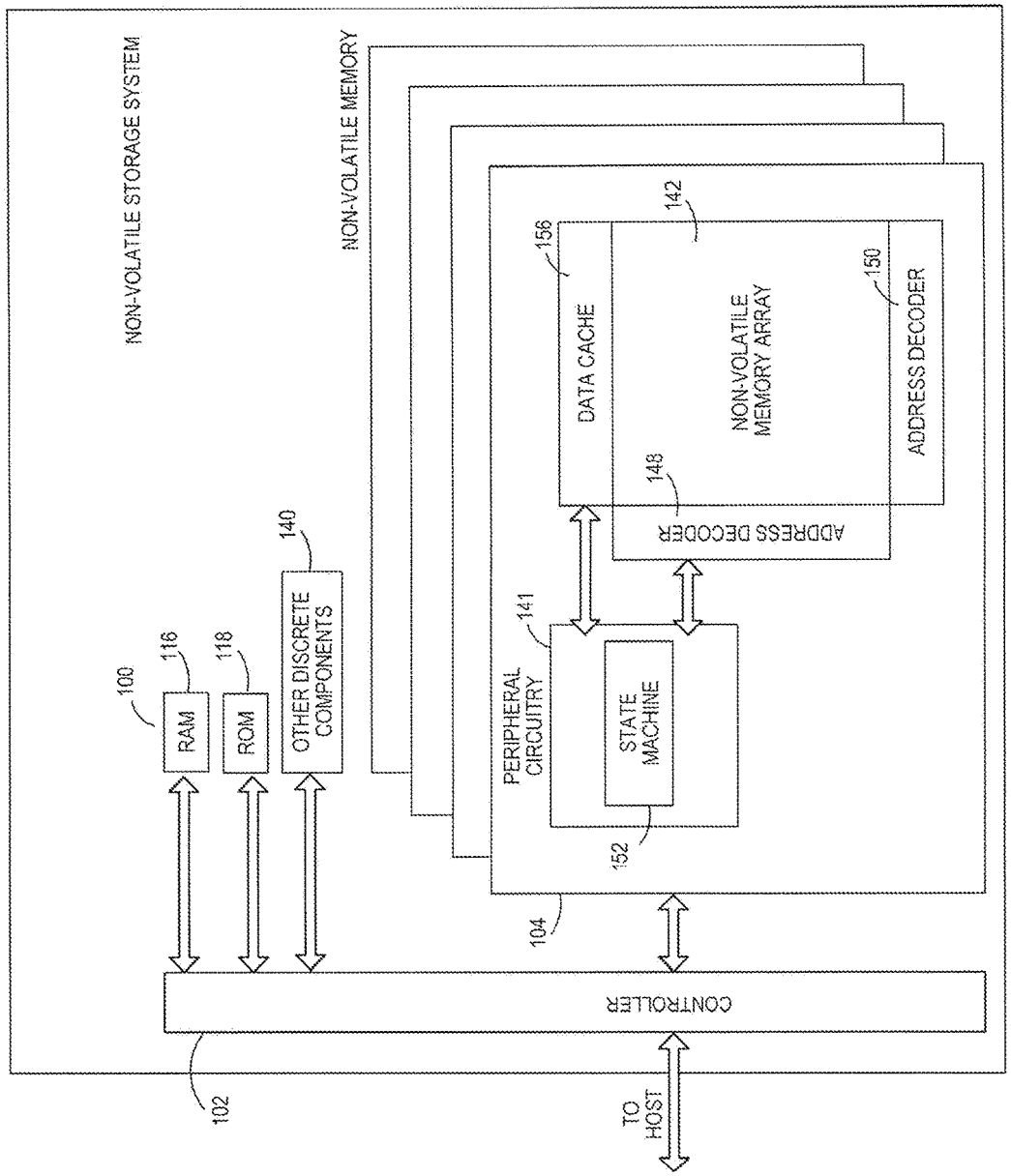
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
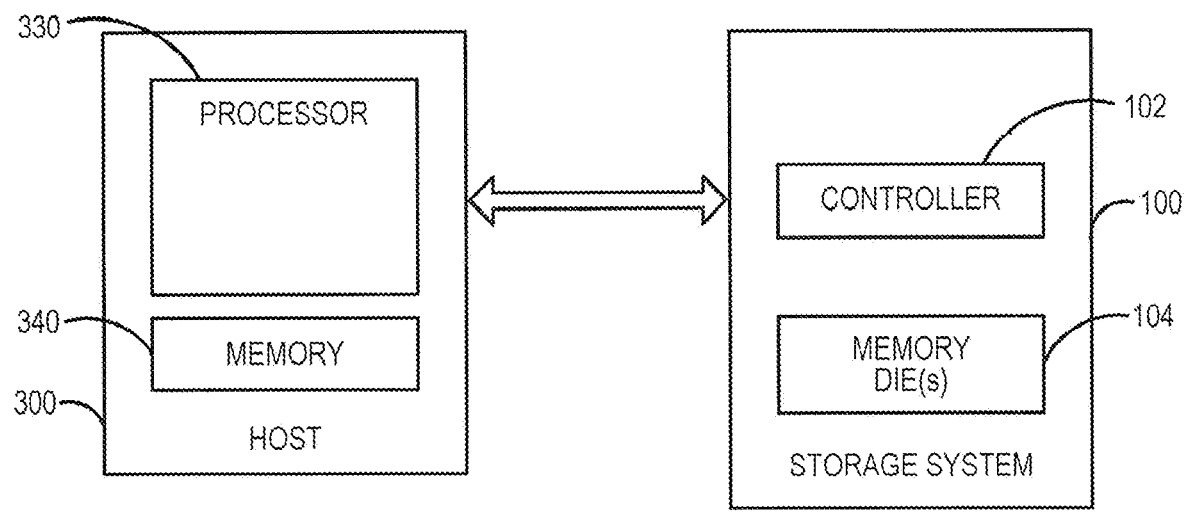
FIG. 3 is a block diagram of a host and a storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340.

As noted above, the host 300 can send a write command with a logical block address to the storage system 100, and the controller 102 in the storage system 100 can store the data in a physical address in the memory 104. When the data takes the form of media content (e.g., video or audio files) with largely sequential data, the data can span multiple blocks. Some prior storage systems can distinguish the blocks based on the amount of valid data stored in a block or on the properties of the block (e.g., how many times the block has been cycles or the bit error rate (BER) of the block). In some other systems, the host can send metadata to the storage system to differentiate various content, and the storage system can use the metadata to treat blocks storing the various content differently. However, in prior storage systems, there is no priority given based on the amount of data actually stored in a block in terms of time duration, which can be important for media content. Also, blocks of media content are typically accessed in a serial fashion, which may be considered slow if blocks contain different amounts of information.

Figure 4:
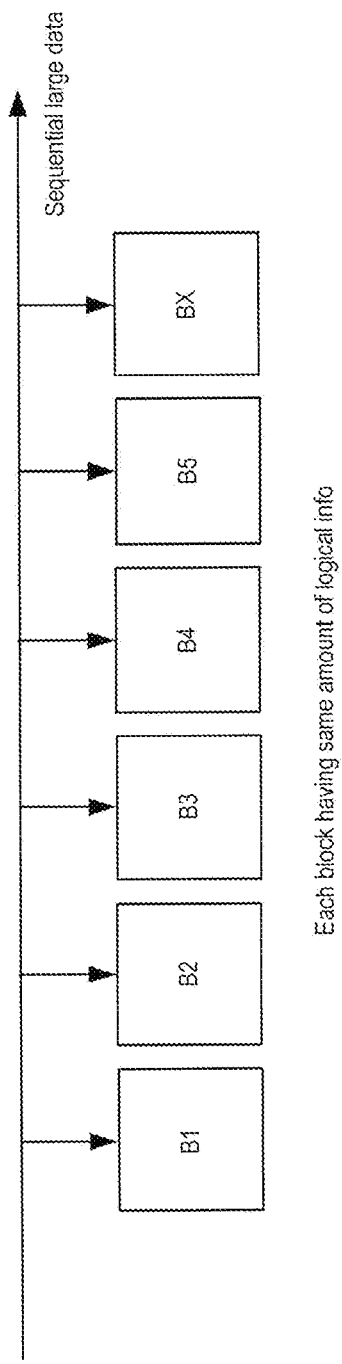
FIG. 4 is an illustration of a plurality of blocks of memory of an embodiment, where each block has the same amount of logical data.

To illustrate these issues, FIG. 4 provides an illustration of a plurality of blocks (B1-BX), each containing the same amount of logical information (e.g., 100 megabytes (MB)). Depending on whether compression was used, one block of 100 MB may represent ten minutes of data playback, while another block of 100 MB may represent two to three minutes of data playback. The block containing ten minutes of data may be considered more important, but both blocks would be treated equally in just look at the total amount of valid data.

The following embodiments can be used to distinguish between such blocks. In general, these embodiments can be used to differentiate between different blocks of the memory 104 based on an amount of time spent programming each of the blocks, which is an approximation of the runtime of the data stored in each of the blocks. (It should be noted that while a block of memory is used in these examples, any suitable granularity of a memory storage area can be used). For example, using the above illustration, the block containing ten minutes of data playback can take longer to program than the block containing two to three minutes of playback data. This is because the controller 102 in the storage system 100 (or the host 300) would be spending more time compressing the data.

Figure 5:
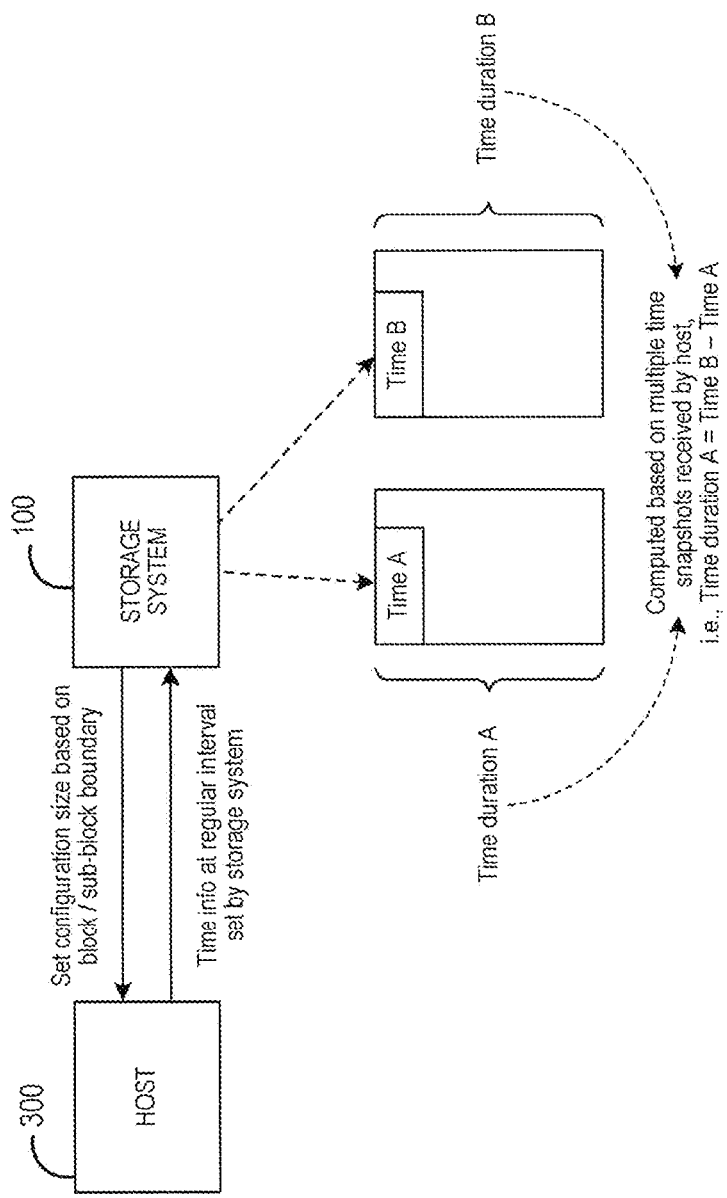
FIG. 5 is an illustration of a method of an embodiment for calculating a time duration of a block of memory.

The programming time duration can be determined in any suitable way. In one embodiment, the storage system 100 receives time information from the host 300 (e.g., time stamps/snapshots at periodic intervals, such as, but not limited to, at a boundary of a block, at a boundary of a sub-block, at a boundary of a set of wordlines, or at a time configured by the user/storage system 100). For example, a time stamp can be sent to the storage system 100 every time the host 300 requests a logical block be written to the memory 104. In this way, each block is associated with at least one time stamp, and the storage system 100 maintains relative time snapshots for various blocks/sub-blocks for time tagging various content in the logical domain. The storage system 100 can maintain the relative block time snapshots that are used to determine the time duration of the content and are also used for time tagging the content. As shown in FIG. 5, the controller 102 in the storage system 100 can determine the time duration for programming a block by subtracting the time stamp of the next block from the time stamp of the present block. Again, if compression is used for data with a longer playback time, the difference in time stamps would be greater than between uncompressed blocks due to the time needed to perform the compression.

As mentioned above, the storage system 100 can differentiate the plurality of blocks based on time durations. Any suitable type of differentiation or prioritization can be used. For example, in one embodiment, the storage system 100 differentiates blocks based on the information contained in terms of time duration for a memory management operation, such as, but not limited to, a garbage collection operation, an error code/data protection operation, a wear leveling operation, a read scrub operation, and a resource sharing operation. In another embodiment, the blocks are differentiated for a search operation. These are just two examples, and other implementations can be used.

Figure 6:
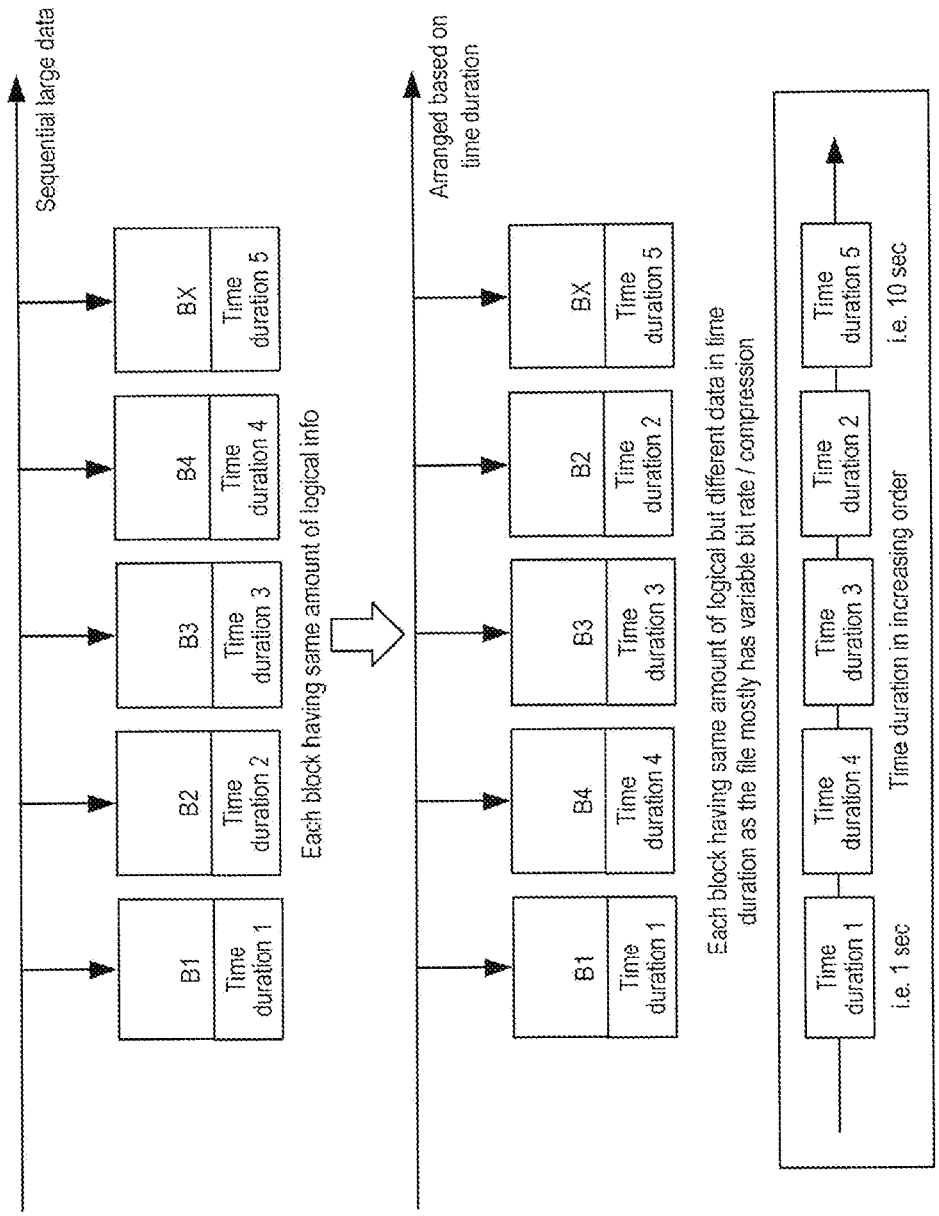
FIG. 6 is an illustration of a method of an embodiment for differentiating blocks of memory based on time durations.
Figure 7:
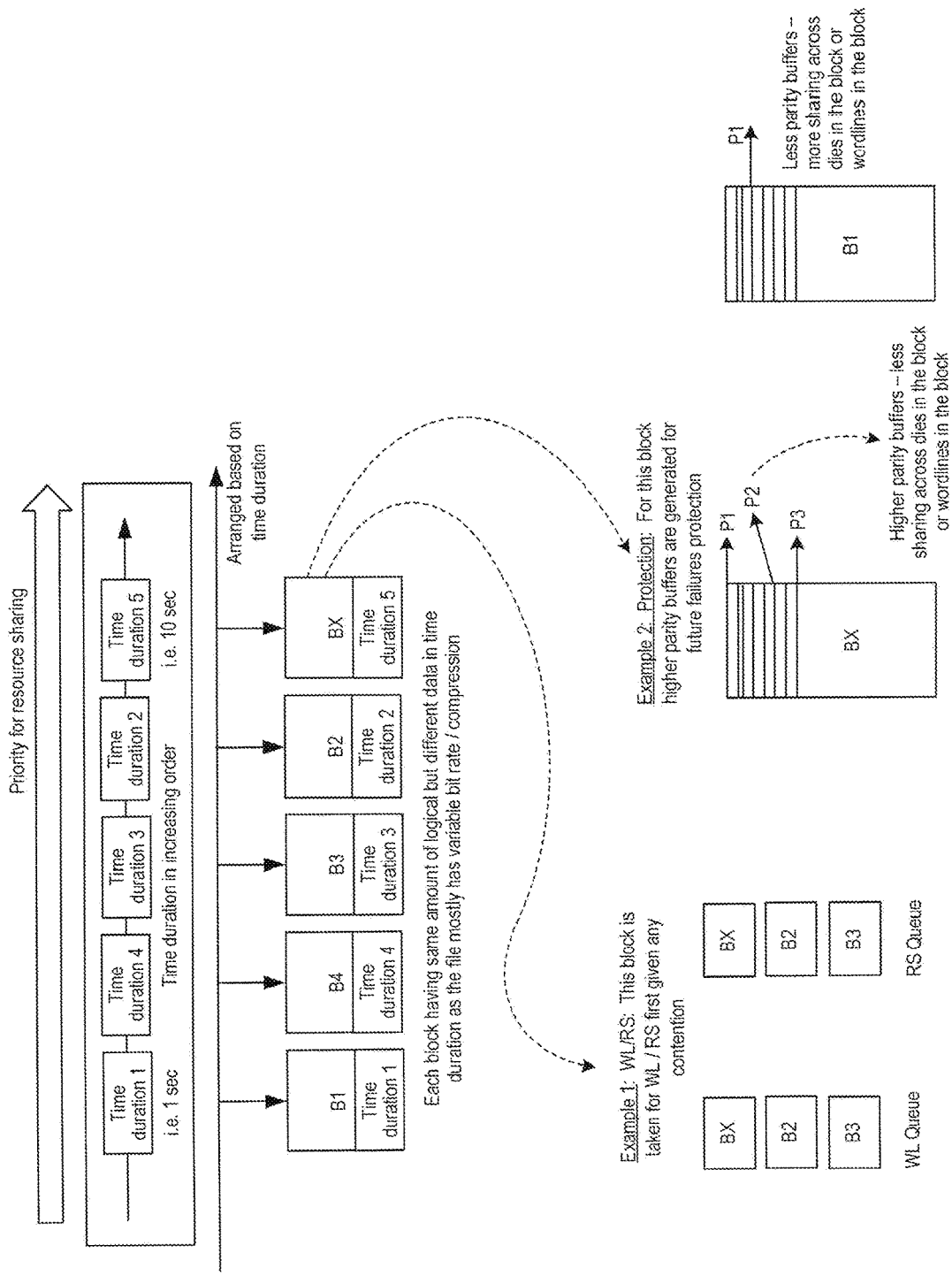
FIG. 7 is an illustration of a method of an embodiment for prioritizing blocks of memory based on time durations.

By managing the blocks based on the information contained in terms of time duration, even if all the blocks have the same amount of valid data, the storage system 100 can still differentiate the blocks based on the amount of information contained as indicated by the time duration. For example, as mentioned above, blocks that have higher content in time duration can be given higher priority for a memory management operation. This is illustrated in FIGS. 6 and 7. As shown in FIG. 6, blocks can be arranged based on the time duration associated with the block. As shown in FIG. 7, blocks that have higher content in time duration are given higher priority for any bookkeeping work, such as garbage collection, read scrubbing (example 1), and data protection (example 2).

Figure 8:
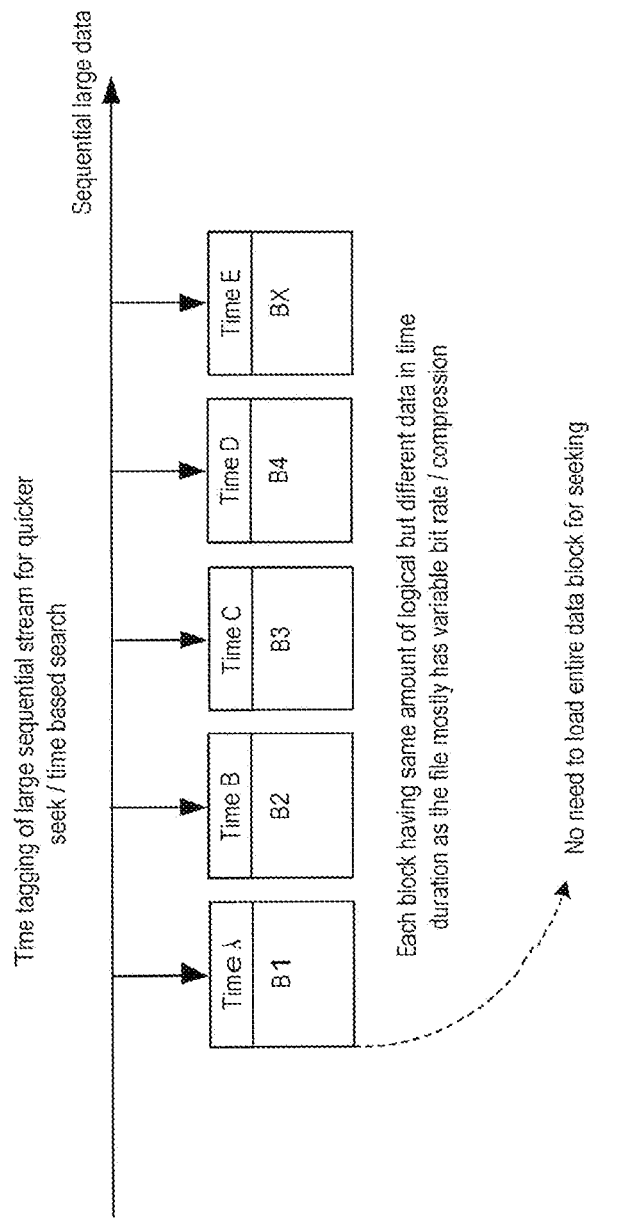
FIG. 8 is an illustration of a method of an embodiment for using time durations to facilitate a seek/search operation.

In another embodiment, the storage system 100 can use the created relative time-tags for the blocks for faster seek/search applications (referred to hereinafter as a "search application") for media content in the memory 104. This is illustrated in FIG. 8. As shown in FIG. 8, the storage system 100 creates relative time tags for the blocks that can be used for time-tagging the content for faster seek/search applications for the media in the memory 104. Here, all time snapshots are relative, and absolute time can be maintained per stream. That is, these embodiments provide a scalable solution, and multiple time snapshots can be maintained for a single block.

There are several advantages associated with these embodiments. By having intelligence in the controller 102/storage system 100 for differentiating content based on time duration, the blocks can be managed better. For example, blocks that contain higher amounts of information can be given priority for any internal work to reduce overall errors and, in the worst case, to reduce the amount of data loss in case of block/wordline failures. By giving blocks with higher overall information priority, these embodiments can result in overall better block management and resources that are shared more efficiently. So, priority can result in both performance reduction and error reduction. By prioritizing, the internal work performance is ensured, and, by having some additional parities (e.g., exclusive-or (XOR) and other mechanisms), overall better protection is provided.

Also, by safeguarding blocks with higher time duration information, the overall failure rate/content loss can be minimized. That is, the storage system's resources are limited, and sharing them based on the priority of the blocks safeguards higher priority blocks first. Additionally, as mentioned above, by tagging blocks with relative time, media seek/search applications can be accelerated, as loading of the entire content is not required (i.e., based on time tagging, some blocks can be skipped for reading).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory comprising a plurality of blocks; and
a controller configured to:
  receive a plurality of time stamps from a host;
  for each block of the plurality of blocks, determine an amount of time spent programming the block based on time stamps associated with start and end times of programming the block, wherein the amount of time includes time spent, if any, compressing data programmed in the block; and
  differentiate the plurality of blocks based on the determined amounts of time;
wherein an amount of time spent programming a given block is determined by calculating a difference between a time stamp for the given block and a time stamp for a subsequent block.

2. The storage system of claim 1, wherein the amount of time for each block is determined by calculating a difference between the time stamps associated with the start and end times of programming the block.

3. The storage system of claim 1, wherein plurality of blocks are differentiated for a memory management operation.

4. The storage system of claim 3, wherein the memory management operation comprises an error protection operation, a wear leveling operation, a read scrub operation, or a resource sharing operation.

5. The storage system of claim 3, wherein the memory management operation comprises a garbage collection operation.

6. The storage system of claim 1, wherein the plurality of blocks are differentiated for a search operation.

7. The storage system of claim 1, wherein a time stamp of the plurality of time stamps is received from the host at a boundary of a block, a boundary of a sub-block, or a boundary of a set of wordlines.

8. The storage system of claim 1, wherein a time stamp of the plurality of time stamps is received from the host at a time configured by the storage system.

9. The storage system of claim 1, wherein the memory comprises a three-dimensional memory.

10. The storage system of claim 1, wherein programming a first block requires a longer amount of time than programming a second block, even though the first and second blocks store a same amount of data, due to time needed to compress data programmed in the first block.

11. The storage system of claim 10, wherein the data programmed in the first block has a longer runtime than data stored in the second block.

12. A method comprising:
performing the following in a storage system comprising a memory comprising a plurality of blocks:
determining an amount of time spent programming each block of the plurality of blocks, wherein an amount of time spent programming a given block includes time spent, if any, compressing data programmed in the given block; and
prioritizing the plurality of blocks based on the determined amounts of time; wherein:
the amounts of time are determined from time information received from a host for each block; and
an amount of time spent programming a given block is determined by calculating a difference between time information for the given block and a subsequent block.

13. The method of claim 12, wherein time information is received from the host at a boundary of a block, a boundary of a sub-block, or a boundary of a set of wordlines.

14. The method of claim 12, wherein time information is received from the host at a time configured by the storage system.

15. The method of claim 12, wherein the plurality of blocks are prioritized for a memory management operation.

16. The method of claim 14, wherein the memory management operation comprises a garbage collection operation, an error protection operation, a wear leveling operation, a read scrub operation, or a resource sharing operation.

17. The method of claim 12, wherein the plurality of blocks are prioritized for a search operation.

18. A storage system comprising:
a memory comprising a plurality of blocks;
means for determining an amount of time spent programming each block of the plurality of blocks, wherein an amount of time spent programming a given block includes time spent, if any, compressing data programmed in the given block; and
means for prioritizing the plurality of blocks based on the determined amounts of time; wherein:
the amounts of time are determined from time information received from a host for each block; and
an amount e spent programming a given block is determined by calculating a difference between time information for the given block and a subsequent block.

* * * * *